US00RE38136E

(19) United States
(12) Reissued Patent
Kolmes

(10) Patent Number: US RE38,136 E
(45) Date of Reissued Patent: Jun. 10, 2003

(54) CUT RESISTANT SUPPORT YARN SUITABLE FOR WRAPPING WITH AN ADDITIONAL YARN COVERING

(75) Inventor: Nathaniel Kolmes, Hickory, NC (US)

(73) Assignee: Supreme Elastic Corporation, Hickory, NC (US)

(21) Appl. No.: 09/372,924

(22) Filed: Aug. 12, 1999

Related U.S. Patent Documents

Reissue of:
(64) Patent No.: 5,655,358
Issued: Aug. 12, 1997
Appl. No.: 08/438,017
Filed: May 8, 1995

U.S. Applications:
(63) Continuation-in-part of application No. 07/641,785, filed on Jan. 16, 1991, now Pat. No. 5,423,168, which is a continuation-in-part of application No. 07/366,886, filed on Jun. 13, 1989, now abandoned, which is a continuation-in-part of application No. 07/176,075, filed on Mar. 31, 1988, and application No. 07/202,338, filed on Jun. 6, 1988, now Pat. No. 4,838,017, said application No. 07/176,075, is a continuation of application No. 06/766,846, filed on Aug. 16, 1985, now abandoned, said application No. 07/202,338, is a continuation of application No. 06/915,140, filed on Oct. 3, 1986, now Pat. No. 4,777,789.

(51) Int. Cl.[7] ..... D02G 3/36; D07B 1/06
(52) U.S. Cl. ..... 57/212; 57/3; 57/214
(58) Field of Search ..... 57/212, 3, 214, 57/213, 215, 216, 217, 902

(56) References Cited

U.S. PATENT DOCUMENTS

| | | | | |
|---|---|---|---|---|
| 831,108 | A | * | 9/1906 | Ryder |
| 1,250,150 | A | | 12/1917 | Du Bois |
| 1,574,004 | A | * | 2/1926 | Ryder |
| 1,736,928 | A | | 11/1929 | Lowe |
| 1,743,729 | A | * | 1/1930 | Pope et al. |
| 2,165,296 | A | * | 7/1939 | Oass |
| 2,335,644 | A | * | 11/1943 | Camp |
| 2,342,098 | A | * | 2/1944 | Alderfer |
| 2,609,653 | A | * | 9/1952 | Peterson |
| 2,774,077 | A | * | 12/1956 | Pressler |
| 2,864,091 | A | | 12/1958 | Schneider ..... 2/161 |
| 3,019,592 | A | * | 2/1962 | Gould et al. |
| 3,026,669 | A | * | 3/1962 | Stanton |
| 3,087,699 | A | * | 4/1963 | Foster |
| 3,145,525 | A | * | 8/1964 | Laureti |
| 3,155,768 | A | * | 11/1964 | Garshick |

(List continued on next page.)

FOREIGN PATENT DOCUMENTS

| | | | | |
|---|---|---|---|---|
| DE | 1610495 | * | 1/1971 | |
| FR | 1539816 | * | 9/1968 | |
| FR | 2643914 | | 9/1990 | ..... D02G/3/36 |
| GB | 187327 | * | 10/1922 | |
| GB | 886740 | * | 10/1962 | |
| GB | 1401378 | * | 7/1973 | |
| JP | 435157 | * | 3/1943 | |
| JP | 4728125 | * | 4/1946 | |
| WO | WO 92/20244 | | 11/1992 | ..... A41D/19/00 |

OTHER PUBLICATIONS

Copy of newsletter published by Allied Fibers, division of AlliedSignal, Inc.; Petersburg, VA identified as: "Kaleidoscope," Issue 3, vol. III, Winter 1988.

*Primary Examiner*—Rodney M. Lindsey
(74) *Attorney, Agent, or Firm*—Oblon, Spivak, McClelland, Maier & Neustadt, P.C.

(57) ABSTRACT

A cut resistant yarn suitable for wrapping with an additional yarn covering. The cut resistant support yarn includes a core including only a first cut resistant strand, a second cut resistant strand wrapped in a clockwise direction around the core, and a third cut resistant strand wrapped in a counter clockwise direction around the core. One of the second and third cut strands forms an inner covering surrounding only core, and only other of the second only and third cut resistant strands forms an outer covering surrounding the core and the inner covering.

29 Claims, 2 Drawing Sheets

U.S. PATENT DOCUMENTS 3,265,809 A * 8/1966 Morieras
3,277,564 A * 10/1966 Webber et al.
3,288,175 A * 11/1966 Valko
3,315,455 A * 4/1967 Stoller
3,315,456 A 4/1967 Freydberg ..... 57/144
3,323,301 A * 6/1967 Jackson, Jr.
3,325,990 A * 6/1967 Laureti
3,336,744 A * 8/1967 Peene
3,405,516 A * 10/1968 Laureti
3,472,289 A 10/1969 Webber et al. ..... 139/425
3,490,224 A * 1/1970 Bourgeas
3,572,397 A * 3/1971 Austin
3,601,970 A 8/1971 Roberts et al. ..... 57/153
3,722,440 A * 3/1973 Igarashi et al.
3,805,667 A * 4/1974 Orser
3,871,946 A 3/1975 Romanski et al. ..... 161/88
3,883,898 A * 5/1975 Byrnes, Sr.
3,900,624 A * 8/1975 Schare ..... 428/97
3,953,893 A * 5/1976 Byrnes, Sr.
3,968,725 A * 7/1976 Holzhauer
4,004,295 A 1/1977 Byrnes, Sr. ..... 2/161 R
4,016,714 A * 4/1977 Cranall et al.
4,074,512 A * 2/1978 Matt
4,186,648 A * 2/1980 Clausen et al.
4,202,382 A * 5/1980 Westhead
4,274,448 A * 6/1981 Westhead
4,290,260 A * 9/1981 Wasserman
4,313,998 A * 2/1982 Pivot et al.
4,321,854 A 3/1982 Foote et al. ..... 87/6
4,350,731 A * 9/1982 Siracusano
4,384,449 A 5/1983 Byrnes, Sr. et al. ..... 57/210
4,458,475 A * 7/1984 Schmit et al.
4,470,251 A 9/1984 Bettcher ..... 57/230
4,526,828 A * 7/1985 Fogt et al.
4,640,179 A * 2/1987 Cameron
4,777,789 A 10/1988 Kolmes et al. ..... 57/210
4,825,470 A * 5/1989 Horio ..... 2/161.8
4,838,017 A 6/1989 Kolmes et al. ..... 57/210
4,886,691 A 12/1989 Wincklhofer ..... 428/68
4,912,781 A * 4/1990 Robins et al. ..... 2/2.5
4,936,085 A 6/1990 Kolmes et al. ..... 57/229
4,967,548 A 11/1990 Fangeat et al. ..... 57/224
5,070,540 A 12/1991 Bettcher et al. ..... 2/2.5
5,113,532 A 5/1992 Sutton ..... 2/167
5,119,512 A 6/1992 Dunbar et al. ..... 2/167
5,287,690 A 2/1994 Toon ..... 57/210
5,423,168 A 6/1995 Kolmes et al. ..... 57/229
5,628,172 A 5/1997 Kolmes et al. ..... 57/210
5,632,137 A 5/1997 Kolmes et al. ..... 57/212
5,644,907 A 7/1997 Kolmes et al. ..... 57/230
5,883,018 A * 3/1999 Bourgois et al. ..... 2/2.5 X

* cited by examiner

CUT RESISTANT SUPPORT YARN SUITABLE FOR WRAPPING WITH AN ADDITIONAL YARN COVERING

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation-in-part of U.S. application Ser. No. 07/641,785, filed Jan. 16, 1991, U.S. Pat. No. 5,423,168, which is a continuation-in-part of U.S. application Ser. No. 07/366,886, filed Jun. 13, 1989, now abandoned, which was a continuation-in-part of U.S. application Ser. No. 07/176,075, filed Mar. 31, 1988, and U.S. application Ser. No. 07/202,338, filed Jun. 6, 1988, U.S. Pat. No. 4,838,017. The aforementioned U.S. application Ser. No. 071176,075 was, in turn a continuation of U.S. application Ser. No. 06/766,846, filed Aug. 16, 1985, now abandoned. The aforementioned U.S. application Ser. No. 07/202,338, was, in turn, a continuation of U.S. application Ser. No. 06/915,140, filed Oct. 3, 1986, US. Pat. No. 4,777,789. All of the foregoing are hereby incorporated by reference.

BACKGROUND OF THE INVENTION

The present invention relates generally to yarns, fabrics and protective garments knitted of such yarns and, more particularly, to an improved cut resistant support yarn suitable for wrapping with an additional yarn covering.

Certain technological advantages of various configurations of yarns, for use in protective garments, and technological advantages of certain fibers which be utilized in yarns for protective garments are known, for example from U.S. Pat. No. 4,777,789. This patent describes numerous uses for cut-resistant yarns and garments such as gloves and aprons for the meat processing industry. Other uses of cut resistant fabric include cut resistant jackets for surrounding a less cut resistant member, such as a rope, webbing; strap, hose, inflatables, and the like. Such cut resistant jackets are disclosed in U.S. Pat. Nos. 4,886,691 and 5,119,512. Other uses of cut resistant yarns may include a protective uniform such as worn by law enforcement officers a those involved in hazardous activities a hazardous sports, and knee and elbow protection pads for cyclists and the like.

However, prior to the present invention, there was a need to provide a support yarn consisting of cut resistant fibers that could be wrapped or spun with an additional yarn in a subsequent covering procedure.

SUMMARY OF THE INVENTION

The present invention provides a new cut resistant support yarn or core yarn that can be subsequently wrapped with an additional yarn covering to form a cut resistant yarn that can be weaved or knitted into a protective fabric usable as a rope, webbing, strap, hose, inflatable, jacket, glove, protective uniforms, and knee and elbow protection pads for cyclists and the like.

It is a further object of the invention to provide a new approach for making a cut resistant support yarn that can be covered with a subsequent yarn covering.

It is yet another object of the present invention to provide a cut resistant support yarn using a minimal number of strands.

The above and other objects are accomplished according to the invention by the provision of a cut resistant support yarn suitable for wrapping with an additional yarn covering. The cut resistant support yarn includes a core strand comprised only of a first cut resistant strand, a second cut resistant strand wrapped in a first, preferably clockwise direction around the core strand, and a third cut resistant strand wrapped in a second direction around the core, opposite to the first direction. One of the second and third cut resistant strands forms an inner covering surrounding the core, and the other of the second and third cut resistant strands forms an outer covering surrounding the core and the inner covering.

Preferably, the first cut resistant strand, the second cut resistant strand and the third cut resistant strand are wire which may be stainless steel.

Further, preferably the first cut resistant strand, the second cut resistant strand, and the third cut resistant strand each consists of one wire.

Although all of the cut resistant strands may be composed of the same cut resistant material, such as stainless steel, the first cut resistant only and at least one of the second and third cut resistant strands may also be comprised of different thickness of stainless steel.

Typically, the first cut resistant strand has a diameter generally in a range of 0.002 inches only 0.005 inches, and is preferably generally about 0.0036 inches. Further, the second and third cut resistant strands each have diameters generally in a range of 0.0015 inches to 0.0036 inches, and are typically generally about 0.0030 inches.

One of the second and third cut resistant strands in generally wrapped around the first cut resistant strand between about 9 to 21 turns per inch to form the inner covering, and the other of the second and third cut resistant strands is wrapped around the first cut resistant strand and the inner covering between about 7 to 19 turns per inch to form the outer covering.

To form the protective fabric, an additional yarn covering typically surrounds the cut resistant support yarn. The additional yarn covering comprises a wrapped outer yarn, or a spun yarn, and is preferably fibrous.

The present invention also contemplates a method of making a cut resistant yarn. A core comprised only of a first cut resistant strand, and second and third cut resistant strands are provided. One of the second and third cut resistant strands is wrapped in a clockwise direction around the core, and the other of the second and third cut resistant strands is wrapped in a counter clockwise direction around the core. An inner covering surrounding the core is formed in connection with one of the wrapping steps, and an outer covering surrounding the core and the inner covering is formed is connection with the other of the wrapping steps. These steps form a support yarn for a subsequent covering, which is either wrapped a spun around the support yarn.

The invention will be described below in greater detail in connection with embodiments thereof that are illustrated in the drawing figures.

BRIEF DESCRIPTION OF THE DRAWINGS

In the drawings, wherein like reference numerals identify corresponding components.

The various benefits and advantages of the present invention will be more easily understood upon reading the following detailed description of the invention taken in conjunction with the drawings.

DETAILED DESCRIPTION OF THE INVENTION

Figure 1:
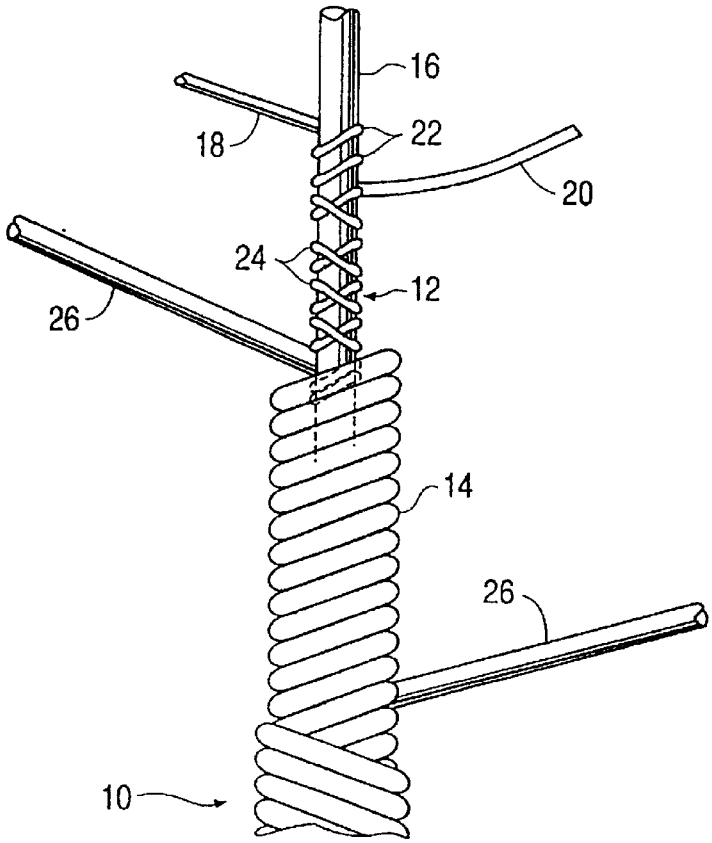
FIG. 1 in an illustration of a typical embodiment of a cut resistant yarn.
Figure 5:
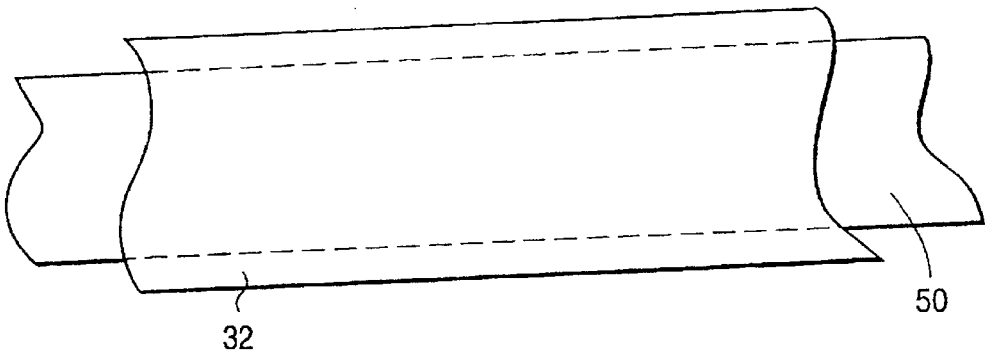
FIGS. 2–5 are illustrations of various protective apparels manufactured using the protective yarn of FIG. 1.

With reference to the drawings, FIG. 1 illustrates a cut resistant yarn 10 comprising a cut resistant support yarn a core yarn 12 and an outer wrap 14 in accordance with the principles of the present invention. The cut resistant support yarn 12 includes a cut resistant core 16 and two cut resistant covering strands or wraps 18, only. Core 16 is comprised only of a cut resistant material, such as a stainless steel wire. Cut resistant covering strand 18, which is a metal wire, is wrapped around the core 16 to form an inner covering 22. Cut resistant covering strand 20, which in likewise a metal wise, is wrapped around both the core 16 and the inner covering 22 to form an outer covering 24. Strands 18 and 20 are wrapped in opposite directions, relative to each other, around the core strand. Stated alternatively, one of the strands 18, 20 is wrapped in a clockwise direction, and the other of the strands is wrapped in a counter-clockwise direction.

Core 16, and strands 18, 20 may be comprised of the same material, such as stainless steel, and may be selectively comprised of dissimilar diameters of cut resistant materials. If stainless is used, the strand will preferably be annealed stainless steel grade 304 wire. Annealed wire is preferred to eliminate any residual magnetic properties.

Core 16 typically consists of only one art resistant monofilament strand having a diameter in a range of 0.002 inches to 0.005 inches, and is preferably about 0.0036 inches in diameter. Covering strands 18, 20 also each typically consists of one cut resistant monofilament strand having a diameter is a range of 0.0015 inches to 0.0036 inches, and are preferably about 0.0030 inches in diameter. Thus, the cut resistant support yarn 12 preferably consists of only three total monofilament strands. Alternatively, instead of monofilament strands, multifilament strands may be used. For example, core 16 may be provided as two or more cut resistant filaments which are parallel, twisted or braided, to form one or more of the cut resistant strands.

Typically, the covering strand 18 is wrapped around core 16 about 9 to 21 turns per inch to form the inner covering. Covering strand 20 is preferably wrapped around inner covering 22 and core 16 about 7 to 21 turns per inch to form the outer covering 24. As mentioned, one of the covering strands is wrapped in a clockwise direction, and the other covering strand is wrapped is a counter clockwise direction, so that the two covering strands are wrapped in opposite directions relative to each other.

After the cut resistant support yarn 12 is formed, it is typically wrapped and covered with one or more additional yarn strands 26 in a subsequent operation for example, in a spinning or wrapping procedure. Yarn strand 26 comprises a fibrous material typically selected from the group including nylon, aramid, extended chain polyethylene, high modulus polyethylene, cotton, wool, fiberglass, polyester, polycotton and asbestos. The particular nylon is preferably a low-shrink nylon. If an aramid is used, it is preferably Kevlar manufactured by Dupont. If extended chain polyethylene is utilized, it is preferably Spectra, manufactured by Allied-Signal Corporation. High modulus polyethylenes include Certran manufactured by Hoerchst Celanese. Vectran manufactured by Hoerchst Celanese may also be used.

Figure 4:
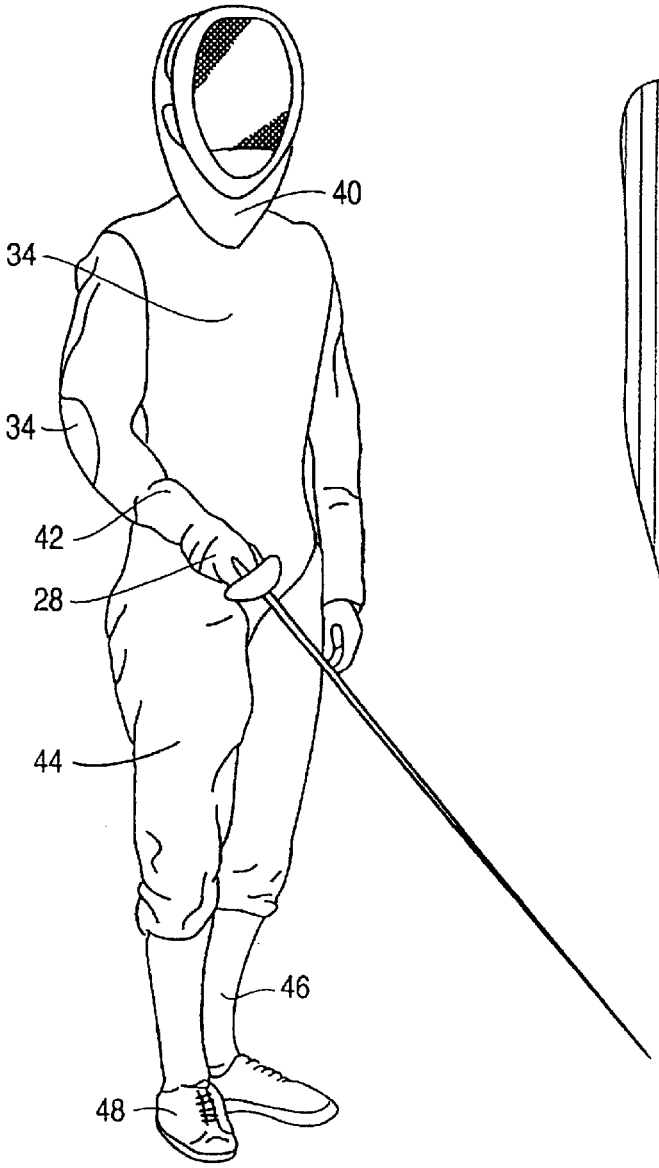
Figure 2:
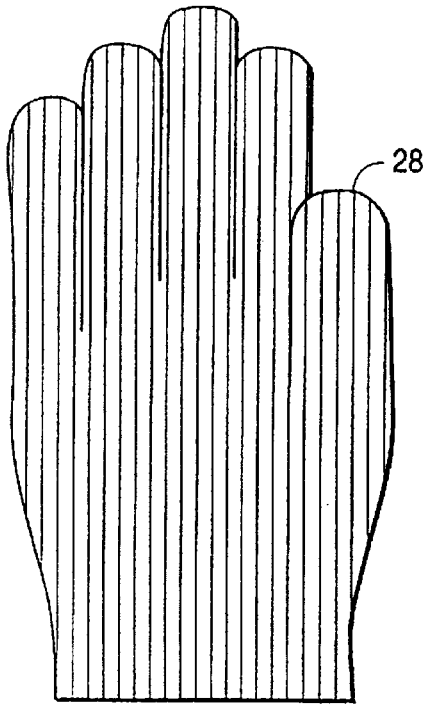
Figure 3:
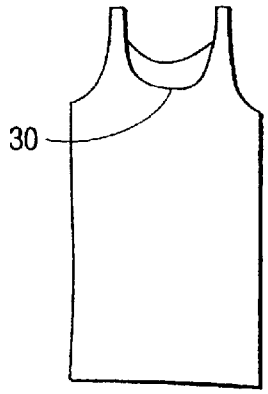

Thus, cut resistant yarn 10 comprises the cut resistant support yarn 12 surrounded by the additional yarn strands 26. As shown is FIGS. 2–5, cut resistant yarn 10 of FIG. 1 can be woven or knitted into a cut resistant fabric to form, for example, cut resistant gloves 28, cut resistant aprons 30, cut resistant jackets or sheaths 32 for surrounding a less cut resistant member, such as a rope, webbing, strap, hose, inflatable member, or the like. Other uses of a fabric made from the present invention include protective uniforms 34 such as could be worn by law enforcement officers or by those involved in hazardous activities or in hazardous sports activities (i.e., the fencer is the illustration), and elbow or knee protection pads 38. Further, as illustrated is FIG. 4, various other protective coverings can be manufactured using a fabric developed according to the present invention, for example bib 40, sleeve 42, breeches 44, stockings 46 and even shoes 48 can include the protective yarn of the invention.

Further, instead of providing a cut resistant jacket or sheath 32 to surround and protect a less cut resistant member 50, the member 50 can be manufactured using the cut resistant yarn of the present invention, thereby reducing or eliminating the need for a cut resistant jacket entirely.

The various strands used in cut resistant yarn 20 need not be identical in composition or denier. Thus numerous variations are contemplated depending on specific considerations such as cost, texture, etc.

The inner a support yarn 12 and the composite yarn 10 in the foregoing embodiment may each be formed on a standard, hollow spindle covering machine (not illustrated). The yarn may thereafter be knitted into protective apparel such as the glove, uniform protective jacket, etc., on a conventional knitting machine such as a Shima Seiki.

Protective apparel knitted of yarn according to the embodiment of the present invention has substantial slash and abrasion resistance is that the protective apparel will protect the wearer from sharp objects or projectiles by preventing the passage of the sharp object or projectile through the fabric.

The invention now being fully described, it will be apparent to one of ordinary skill in the art that any changes and modifications can be made thereto without departing from the spirit or scope of the invention as set forth herein.

What is claimed is:

1. A cut resistant support yarn suitable for wrapping with an additional yarn covering the cut resistant support yarn comprising;

a core comprised of a first cut resistant strand;

a second cut resistant strand wrapped in a clockwise direction around the core; and a third cut resistant strand wrapped in a counts clockwise direction around the core, wherein one of the second and third cut resistant strands forms an inner covering surrounding the core, and the other of the second and third cut resistant strands forms an outer covering surrounding the core, and the inner covering, each of said strands being formed of metal.

2. A cut resistant support yarn as defined in claim 1 wherein the first cut resistant strand, the second cut resistant strand and the third cut resistant strand are selected from the group consisting of monofilament and multifilament wire and stainless steel.

3. A cut resistant support yarn as defined is claim 1, wherein the first cut resistant strand comprises stainless steel.

4. A cut resistant support yarn as defined in claim 1, wherein the first cut resistant strand, and at least one of the second and third cut resistant strands are comprised of stainless steel.

5. A cut resistant support yarn as defined in claim 1, wherein the first cut resistant strand has a diameter generally in a range of 0.002 inches to 0.005 inches.

6. A an resistant support yarn as defined is claim 5, wherein the first cut resistant strand has a diameter generally about 0.0036 inches.

7. A cut resistant support yarn as defined in claim 1, the second and third cut resistant strands each have diameters generally in a range of 0.0015 inches to 0.0036 inches.

8. A cut resistant support yarn as defined in claim 7, wherein at least one of the second and third cut resistant strands has a diameter generally about 0.0030 inches.

9. A cut resistant support yarn as defined in claim 1, wherein the first cut resistant strand, the second cut resistant strand, and the third cut resistant strand each consists of one wire.

10. A cut resistant support yarn as defined in claim 1, wherein at least one of the first cut resistant strand, the second cut resistant strand and the third cut resistant strand is formed from a multifilament wire.

11. A cut resistant, protective apparel, formed of a cut resistant yarn, the cut resistant yarn comprising:

a cut resistant support yarn comprising:

a core comprised only of a first cut resistant strand;

a second cut resistant strand wrapped in a clockwise direction around the core; and a third cut resistant strand wrapped in a counter clockwise direction around the core, wherein one of the second and third cut resistant strands forms an inner covering around the core, and the other of the second and third cut resistant strands forms an outer covering around the core and the inner covering, each of said first, second, and third cut resistant strands being formed of metal.

12. A cut resistant, protective apparel as defined in claim 11, said cut resistant yarn comprising an additional yarn covering surrounding the cut resistant support yarn.

13. A cut resistant, protective apparel as defined in claim 12, wherein the additional yarn covering comprises one of a wrapped outer yarn and a spun yarn.

14. A cut resistant, protective apparel as defined in claim 12, wherein the additional yarn covering comprises a fibrous material.

15. A method of making a cut resistant yarn, comprising the steps of:

providing a core comprised only of a first cut resistant strand, and second and third cut resistant strands;

wrapping one of the second and third cut strands in a clockwise direction around the core;

wrapping the other of the second and third cut resistant strands in a counter clockwise direction around the core;

thereby forming in connection with one of said wrapping steps an inner covering surrounding the core, and an outer covering surrounding the core and the inner covering each and acid first, second and third cut resistant strands being formed of metal.

16. A method of making a cut resistant yarn as defined in claim 15, further comprising the step of providing an additional covering surrounding the support yarn.

17. A method of making a cut resistant yarn as defined in claim 16, further comprising the step of wrapping the additional covering around the support yarn.

*18. The cut resistant support yarn as defined in claim 1, wherein one of the second and third cut resistant strands is wrapped around the first cut resistant strand in a range between about 9 to about 21 turns per inch to form the inner covering.*

*19. The cut resistant support yarn as defined in claim 1, wherein one of the second and third cut resistant strands is wrapped around the first cut resistant strand and the inner covering in a range between about 7 to about 19 turns per inch to form the outer covering.*

*20. A cut resistant support yarn suitable for wrapping with an additional yarn covering, the cut resistant support yarn comprising:*

*a core comprised of a first cut resistant strand;*

*a second cut resistant strand wrapped in a clockwise direction around the core; and*

*a third cut resistant strand wrapped in a counter clockwise direction around the core;*

*wherein one of the second and third cut resistant strands forms an inner covering surrounding the core, and the other of the second and third cut resistant strands forms an outer covering surrounding the core and the inner covering,*

*each of said strands being formed of metal;*

*and further wherein said one strand is wrapped around the first cut resistant strand in a range between about 9 to about 21 turns per inch;*

*and further wherein said other strand is wrapped around the first cut resistant strand and the inner covering in a range between about 7 to about 19 turns per inch.*

*21. The cut resistant support yarn as defined in claim 20, wherein the first cut resistant strand, the second cut resistant strand and the third cut resistant strand are selected from the group consisting of monofilament and multifilament wire and stainless steel.*

*22. The cut resistant support yarn as defined in claim 20, wherein the first cut resistant strand comprises stainless steel.*

*23. The cut resistant support yarn as defined in claim 20, wherein the first cut resistant strand, and at least one of the second and third cut resistant strands are comprised of stainless steel.*

*24. The cut resistant support yarn as defined in claim 20, wherein the first cut resistant strand has a diameter generally about 0.0036 inches.*

*25. The cut resistant support yarn as defined in claim 20, wherein at least one of the second and third cut resistant strands has a diameter generally about 0.0030 inches.*

*26. A method of making a cut resistant yarn comprising the steps of:*

*providing a core comprising first cut resistant strand of metal;*

*providing a second cut resistant strand of metal;*

*providing a third cut resistant strand of metal;*

*wrapping one of the second and third cut resistant strands of metal around said core in a direction selected from the group consisting of clockwise and counterclockwise; and*

*wrapping the other of the second and third cut resistant strands of metal in a direction selected from the group consisting of clockwise and counterclockwise such that the second cut resistant strand is not wrapped in the same direction as the third cut resistant strand;*

*thereby forming an inner covering surrounding the core, and an outer covering surrounding the core and the inner covering.*

*27. The method of making a cut resistant yarn as claimed in claim 26, further comprising the step of providing an additional covering capable of surrounding the support yarn.*

*28. The method of making a cut resistant yarn as claimed in claim 27, further comprising the step of wrapping the additional covering around the support yarn.*

*29. The method of making a cut resistant yarn as claimed in claim 26 wherein the strand of metal forming the inner covering is wrapped around the core in a range between about 9 to about 21 turns per inch and the strand of metal forming the outer covering is wrapped around the core and inner covering in a range between about 7 to about 19 turns per inch.*

* * * * *